United States Patent [19]

Fox et al.

[11] 4,434,754

[45] Mar. 6, 1984

[54] METHOD OF ON SITE CHARGING OF DISTRIBUTOR MAGNET

[75] Inventors: David H. Fox, Ann Arbor; Charles C. Kostan, Canton Township, Plymouth County; Frank B. Casaceli, Mt. Clemens, all of Mich.

[73] Assignee: Ford Motor Company, Dearborn, Mich.

[21] Appl. No.: 432,887

[22] PCT Filed: Aug. 27, 1982

[86] PCT No.: PCT/US82/01168

§ 371 Date: Aug. 27, 1982

§ 102(e) Date: Aug. 27, 1982

[51] Int. Cl.³ .......................... F02P 7/00; H02K 11/00

[52] U.S. Cl. ........................ 123/146.5 A; 123/146.5 R

[58] Field of Search ................. 123/146.5 A, 146.5 R, 123/612, 617, 414, 476; 310/70 A, 70 R; 324/208; 200/190

[56] References Cited

U.S. PATENT DOCUMENTS

| | | | |
|---|---|---|---|
| 3,783,314 | 1/1984 | Kostan | 123/146.5 A |
| 4,166,966 | 9/1979 | Wittlinger et al. | 123/146.5 A |
| 4,307,698 | 12/1981 | Toshinari | 123/146.5 A |
| 4,370,965 | 2/1983 | Grossner et al. | 123/146.5 A |

*Primary Examiner*—Raymond A. Nelli
*Attorney, Agent, or Firm*—Peter Abolins; Robert D. Sanborn

[57] ABSTRACT

A method of assembling a distributor (10) includes integrally mounting a magnetizable ring (14) directly to a camshaft (20) and establishing magnetic poles on the ring (14) when the engine is in a known position. A sensor (54) has a known position with respect to the poles on ring (14) and is used to generate information about engine rotation.

8 Claims, 7 Drawing Figures

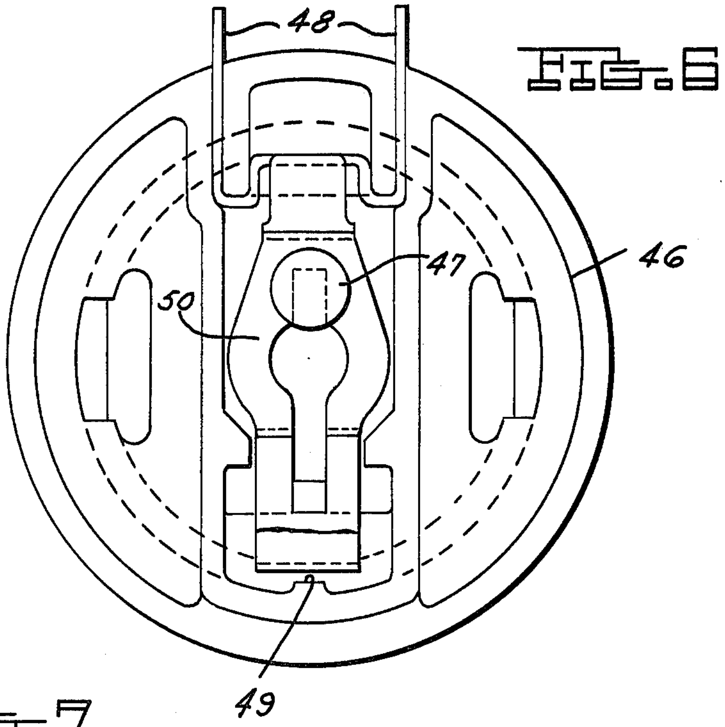
FIG. 6
FIG. 7
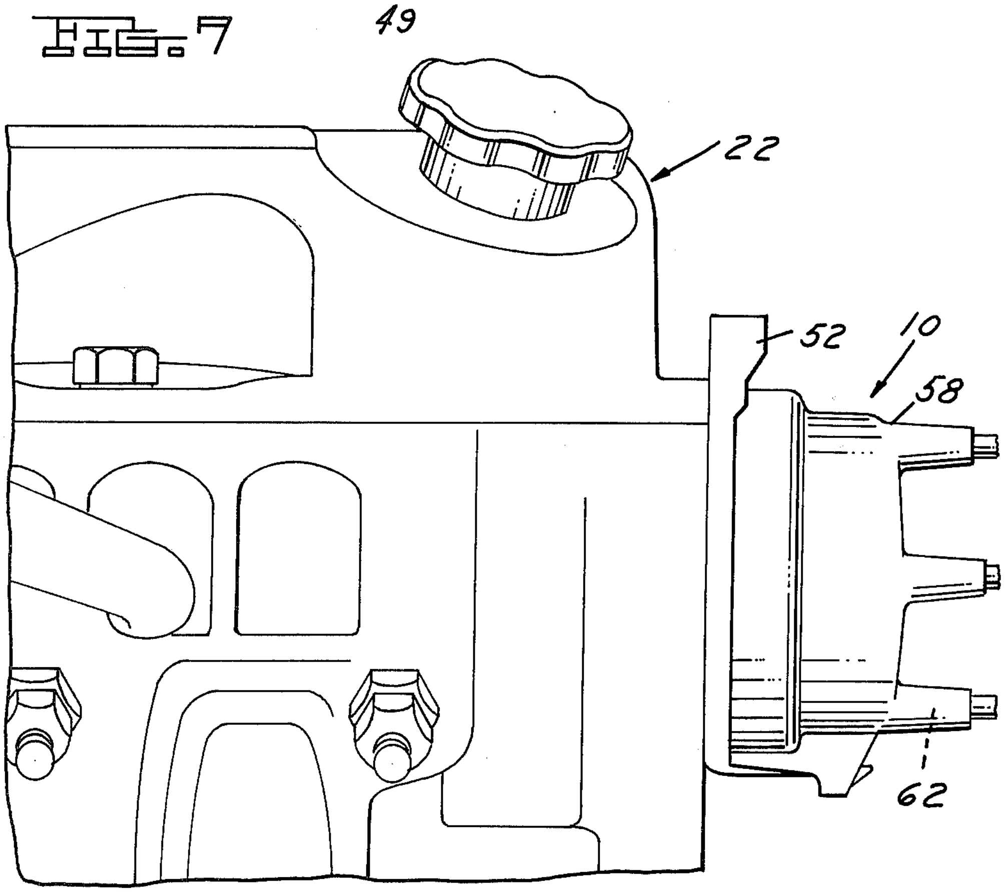

METHOD OF ON SITE CHARGING OF DISTRIBUTOR MAGNET

This application relates to commonly assigned co-pending application Ser. No. 432,892, Filed Aug. 27, 1982, entitled "Distributor Construction and Signal Generator", invented by F. B. Casaceli; D. H. Fox and C. C. Kostan.

TECHNICAL FIELD

This invention relates to a method for orienting a magnetic element for producing an electrical signal in synchronism with the periodic movement of a piston in an internal combustion engine.

BACKGROUND ART

In machines having a cyclic operation, as in an internal combustion engine, certain operations or certain movements must be controlled or actuated in synchronism with the displacement or rotation of a part such as the crankshaft. For example, the occurrence of spark ignition, fuel injection, and movement of a valve, must be coordinated. One of the known difficulties is to mount a position sensor so that it has a fixed, known position with respect to a reference position of the moving engine. When an engine position is established so that the number one cylinder has a piston at top dead center, the distributor can be mounted on the engine so that the position sensor indicates the engine's position. However, such mounting is typically subject to a mechanical mounting error.

For example, U.S. Pat. No. 3,517,142 to Hans-Dieter Bastam et al teaches a typical mechanical connection where a signal generator assembly is mounted on a distributor shaft and cooperates with two pivotable contacts. U.S. Pat. No. 4,235,213 to Jellissen teaches an ignition system housing to provide timing signals fo an automotive ignition distributor system. A housing is mounted on a swing arm. The housing is fixed in position and locked in place by screws engaged in the threaded central bores of the housing. The housing is attached to the swing arm by having bosses positioned within the cavities.

In the systems taught in both these patents, the errors inherent in such mechanical mountings of the signal generating circuit reduce the correlation between the actual position of the engine and the indicated position to the engine. These are some of the problems this invention overcomes.

DISCLOSURE OF INVENTION

In accordance with an embodiment of this invention, a method of assembling a distributor includes integrally mounting a distributor rotor and shaft assembly directly to a camshaft, then positioning an uncharged magnet on the distributor shaft assembly and charging the magnet in place thereby insuring accurate engine initial timing. The charging occurs after a known engine position is established. Such in place charging of the magnet eliminates manufacturing tolerances that contribute to inaccuracies between the indicated and actual crankshaft positions.

BRIEF DESCRIPTION OF THE DRAWINGS

FIG. 6 is a top view of the rotor of a distributor in accordance with an embodiment of this invention; and FIG. 7 is a side view of an engine and a distributor mounted thereon in accordance with an embodiment of this invention.

BEST MODE FOR CARRYING OUT THE INVENTION

Figure 1:
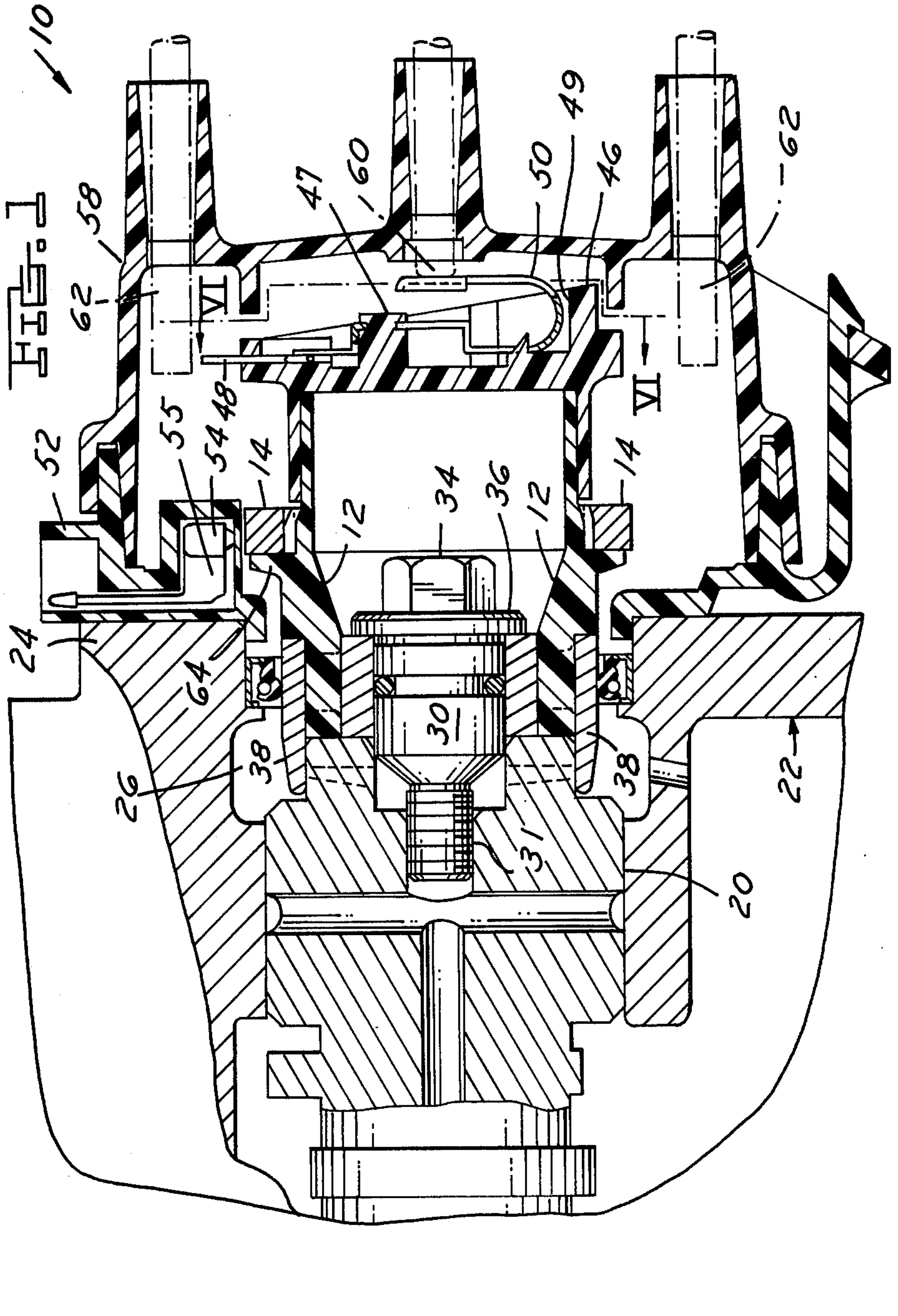
FIG. 1 is a cross-section of a distributor mounted on an engine camshaft in accordance with an embodiment of this invention.
Figure 5:
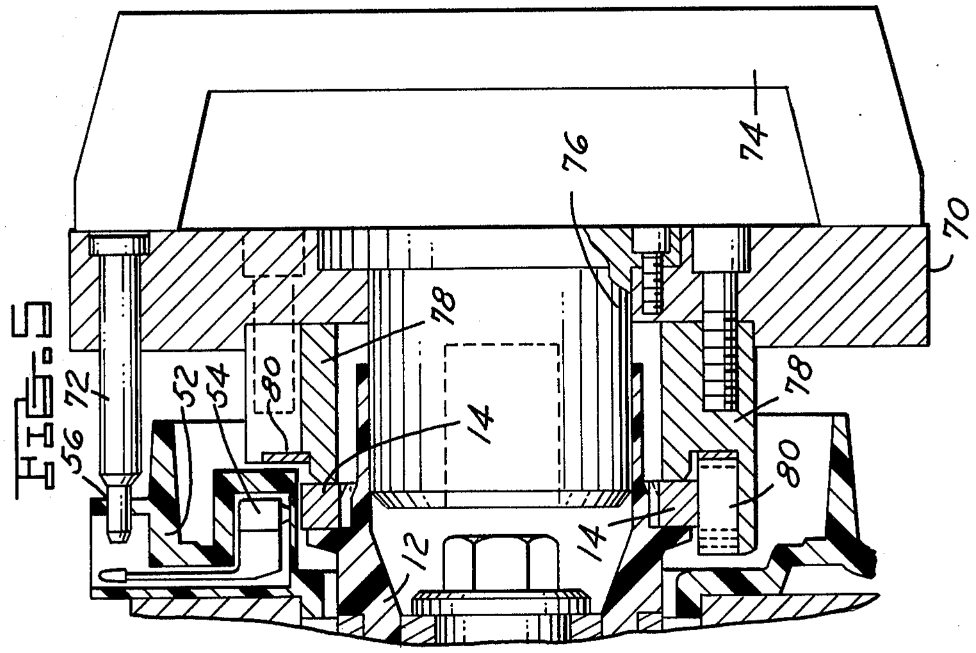
FIG. 5 is a section view taken generally along section line 5—5 of FIG. 4 and includes a portion of the distributor of FIG. 1 to show how the magnetic charging tool mates with the distributor.

Referring to FIGS. 1 and 7, distributor 10 is directly mounted on a camshaft 20 of an engine 22. An intermediate shaft 12 is mounted and oriented directly on camshaft 20 eliminating the need for any bearings. A ring-like magnet 14 is positioned on intermediate shaft 12 to provide an indication of the rotational position of intermediate shaft 12, of camshaft 20 and therefore of the engine crankshaft. Magnetic poles are induced in magnet 14 after magnet 14 is positioned on intermediate shaft 12. Such in place charging of magnet 14 (FIG. 5) permits accurate correlation between the rotational position of the magnetic poles on magnet 14 and the rotational position of the crankshaft in engine 22. As a result, it is possible to compensate for manufacturing tolerances which may otherwise contribute to inaccuracies.

Intermediate shaft 12 is a generally hollow cylinder with decreasing diameter toward the end mounted on the outer diameter of camshaft 20. A screw 34 in combination with a washer 36 is attached to a mounting stud 30 and engages an insert 38 coupled to intermediate shaft 12 thereby securing intermediate shaft 12 to mounting stud 30. Mounting stud 30 has a threaded portion 31 which screws into the central opening of camshaft 20. Intermediate shaft 12 has a plurality of radial, circumferentially spaced openings at the end adjacent camshaft 20. Insert 38 is a web that extends through the radial openings in intermediate shaft 12 and has integral circumferential ring-like portions both inside and outside intermediate shaft 12. Intermediate shaft 12 is formed of a combination of powdered metal and plastic. Similarly, insert 38 is also formed of a plastic and powdered metal combination and formed in place by injection around intermediate shaft 12.

Figure 2:
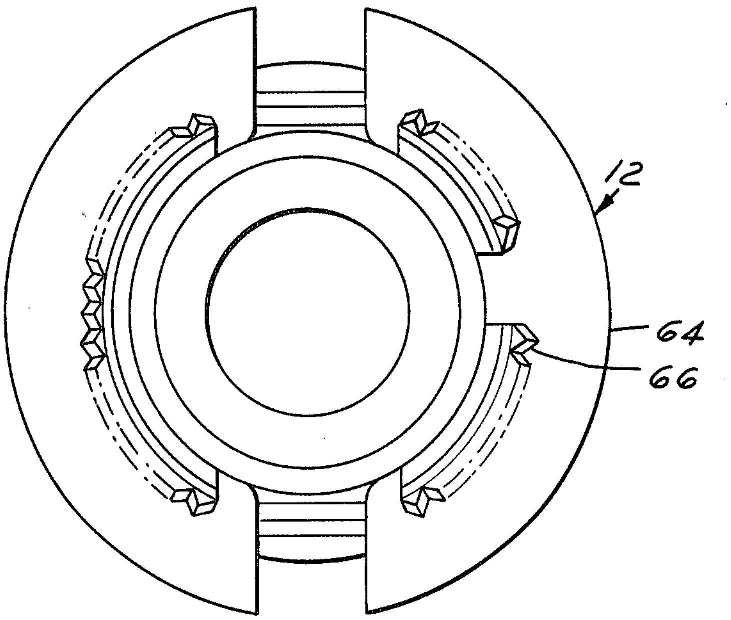
FIG. 2 is an end view of an intermediate shaft which is coupled to the engine camshaft.
Figure 3:
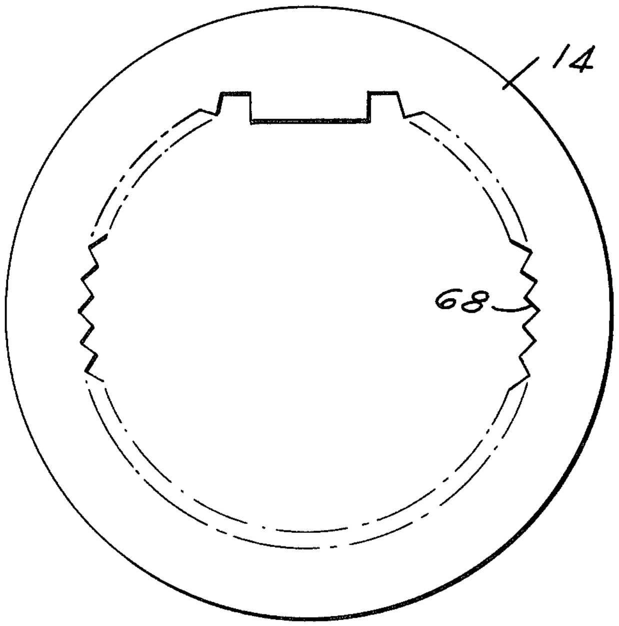
FIG. 3 is an end view of a magnet to be mounted on the intermediate shaft in accordance with an embodiment of this invention.

A lip seal 42 between insert 38 and engine head 24 acts as a seal to keep oil in passages 26 around camshaft 20 from leaking from engine 22. A shoulder portion 64 of intermediate shaft 12 supports magnet 14 as shown in FIG. 2. Shoulder portion 64 has circumferential, outwardly facing teeth 66. Magnet 14 (FIG. 3) has circumferential, inwardly facing teeth 68 for engaging teeth 66.

The end of intermediate shaft 12 projecting away from engine 22 supports a rotor 46 (see FIG. 6). Rotor 46 carries a staple-like electrode 48 and spring 50. The mounting of spring 50 on rotor 46 is accomplished by a compression fit and uses no secondary mounting process such as a rivet or a heat stake. Rotor 46 includes a clamp-like ledge 47 to hold down spring 50. A back stop 49 acts in cooperation with ledge 47 to positively hold spring 50 to rotor 46. Such a construction for attaching spring 50 provides a positive locking feature to electrode 48 thus insuring a positive, electrically conductive path between the two pieces. Staple-like electrode 48 reduces cost of manufacturing. The wire drawn material minimizes material costs and weight. The staple form can be obtained by relatively low cost tooling. The sharp pointed electrode design also reduces the generation of high levels of radio frequency interference.

Sensor 54 (FIGS. 1 and 5) is coupled to an electronic engine control and provides crankshaft position information. Sensor 54 is a bipolar Hall-type device. The bipolar feature results in a sensor that switches on and off by being subjected to a positive magnetic flux and a negative magnetic flux after experiencing a zero flux condition at transitions between positive and negative magnetic flux. A positive magnetic flux is associated with the passage of a north magnetic pole on magnet 14 and a negative magnetic flux is associated with the passage of a south magnetic pole on magnet 14.

A sensor holder 52 (FIGS. 1, 5 and 7) is mounted on head 24 and supports bipolar Hall-type sensor 54 in proximity to magnet 14. Sensor holder 52 includes charging tool locating holes 56 for receiving pins 72 positioning a charging tool 70 to charge magnet 14 (see FIG. 5). Accordingly, after magnet 14 is positioned on intermediate shaft 12, sensor holder 52 is mounted on head 24, and the engine position is determined to be in a known position (such as top dead center of cylinder one). Sensor holder 52 also supports distributor cap 58 in proximity to spring 50 and electrode 48 so that a firing voltage can be supplied through a central electrode 60 to spring 50 and distributed through electrode 48 to a plurality of spark plug associated electrodes 62 (FIG. 1).

Figure 4:
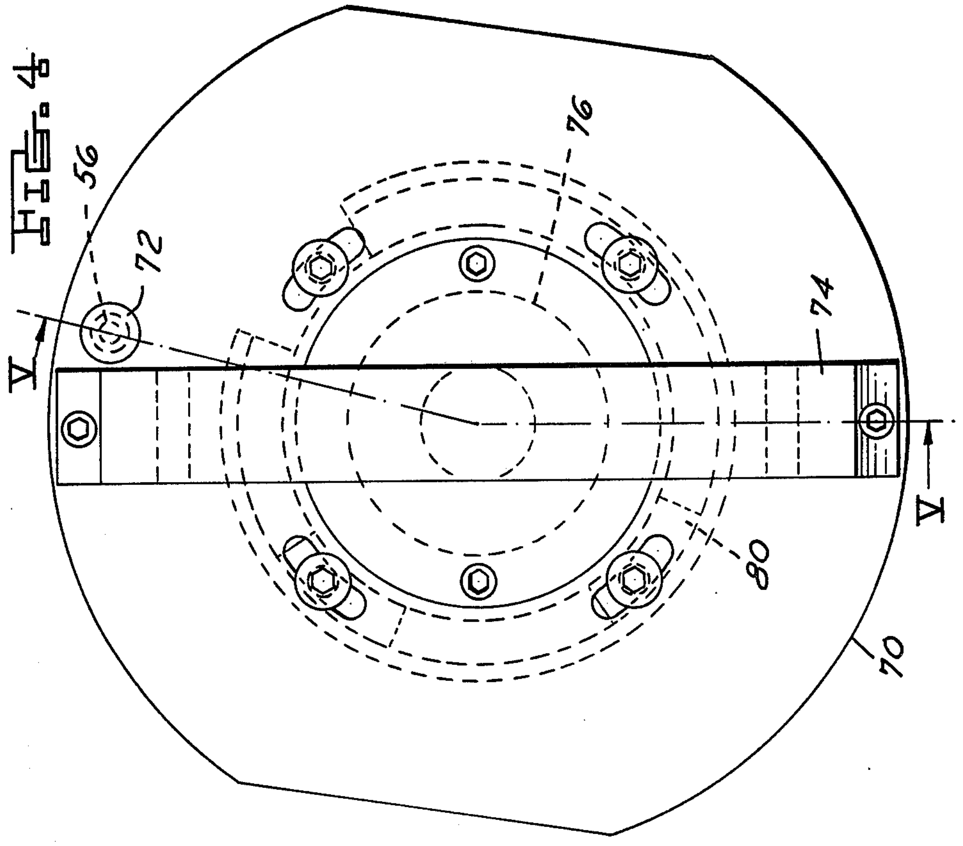
FIG. 4 is an elevation view of a magnetic charging tool for a distributor in accordance with an embodiment of this invention.

Charging tool 70 (FIGS. 4 and 5) is generally circular with a protruding handle 74. A circular pilot 76 extends along the axis of charging tool 70 for engaging the central opening of intermediate shaft 12. A pair of pins 72 extend parallel to pilot 76 for engaging locating holes 56. A partially hollow cylindrical portion 78 extends around pilot 76 along the outside of intermediate shaft 12 to magnet 14. An undulating conductor bus bar 80 is supported by cylindrical portion 78 adjacent magnet 14. The undulations are, in sequence, axially upward, circumferential, axially downward, circumferential, axially upward, and so on. The axial portions of bus bar 80 are spaced about 45° apart so that current flowing in bus bar 80 induces eight magnet poles in magnet 14. Magnet 14 is mounted on intermediate shaft 12 as an uncharged injection molded plastic magnet containing oriented magnetic dipoles. The engine crankshaft is positioned to a known position (relative to top dead center of cylinder number one) and a magnetizing fixture is located relative to sensor 54 and magnet 14. At this point, torque can be applied to camshaft 20 to take up any timing belt looseness and the magnet 14 is mangetized.

Ring-like magnet 14 is magnetized relative to a known engine position so that the 45° north and south poles are generated alternately over the outer diameter of the magnetic in a location such that the sensor switches at a prescribed point relative to the known engine position. Advantageously, bipolar Hall-type sensor 54 is potted in the plastic base which is mounted directly to the engine head to assure a positive known location in relation to the rotation of the magnet. For example, the crankshaft can be located at 35° after top dead center (ATDC) so that charging conductors can be equally spaced around sensor. This will result in a signal being generated at 10° before top dead center (BTDC) by the sensor during engine operation.

Sensor 54 is triggered by a low magnetic flux level, such as plus and minus 50 gauss around a zero flux transition point, and its sensitivity to air gap size, temperature and run-out variation is minimal. The maximum amplitude of magnetic flux at the pole face is approximately 900 gauss. Sensor holder 52 also contains a pole piece 55 (FIG. 1) adjacent sensor 54 to focus the magnetic flux from magnet 14 thereby concentrating the flux to improve the accuracy of sensor 54.

Various modifications and variations will no doubt occur to those skilled in the various arts to which this invention pertains. For example, the particular configuration of the sensor holder may be varied from that described herein. These and all other variations which basically rely on the teachings through which this disclosure has advanced the art are properly considered within the scope of this invention.

We claim:

1. A method for orienting a distributor on an internal combustion engine so as to produce an electrical signal in synchronism with the periodic movement of an engine part, said method comprising the stesp of:

coupling a magnetizable material to the camshaft of the internal combustion engine;

establishing a sensor reference point on the engine, said reference point being stationary with respect to the engine block;

positioning the pistons of the engine and the coupled magnetizable material in a known position, with respect to said reference point; and inducing magnetic poles in said magnetizable material so that said magnetic poles have a known rotational relationship to said reference point.

2. A method for orienting a distributor on an internal combustion engine as recited in claim 1 wherein said step of coupling a magnetizable material to the camshaft includes:

attaching an intermediate shaft means with a supporting ledge adjacent circumferential positioning teeth and a generally axial pilot opening to the camshaft; and orienting the magnetizable material by placing a ring-like magnetizable material with generally circumferential inwardly facing positioning teeth adjacent the supporting ledge so that the magnetizable material is rotationally secured with respect to the intermediate shaft.

3. A method for orienting a distributor on an internal combustion engine as recited in claim 1 wherein said step of establishing a sensor reference on the engine includes the steps of:

mounting a sensor holder means on the engine block to provide a holder for a magnetic pole sensor and a holder for a charging tool for inducing magnetic poles in the magnetic material; and positioning a sensor means in said sensor holder means for detecting the passage of magnetic poles adjacent the sensor means.

4. A method for orienting a distributor on an internal combustion engine as recited in claim 3 wherein the step of incuding magnetic poles includes the steps of:

placing a conductor means adjacent the magnetic material so that a current path of alternating direction exists adjacent said magnetic material; and applying current to the conductor means to induce magnetic poles of alternating polarity in the magnetic material.

5. A method of orienting a distributor on an internal combustion engine as recited in claim 4 wherein the steps of placing a conductor means adjacent the magnetic material includes the steps of:

positioning radially the conductor means by inserting a pilot extending from the conductor means into the axial pilot opening of the intermediate shaft means; and positioning rotationally the conductor means by inserting a pin means, spaced from the pilot means, extending from the conductor means into the holder for the charging tool of the sensor holder means.

6. A method of orienting a distributor on an internal combustion engine as recited in claim 5 wherein the step of placing a conductor means adjacent the magnetic material includes:

having the current path of alternating direction extend axially toward the engine for a distance greater than the axial thickness of the magnetic material, circumferentially for about 45° around the magnetic material and axially away from the engine for a distance greater than the axial thickness of the magnetic material, circumferentially for an additional 45° around the magnetic material, in a repetitive sequence until the total circumferential travel is about 360°.

7. A method of orienting a distributor on an internal combustion engine as recited in claim 6 further comprising:

positioning a rotor means on the intermediate shaft means for rotating with the intermediate shaft means and delivering a firing voltage to the spark plugs; and rotationally orienting the rotor means by positioning it on the intermediate shaft when the magnetizable material has a known orientation with respect to the sensor reference point and the rotor means.

8. A method for assembling a distributor on an internal combustion engine for producing an electrical signal in synchronism with the periodic movement of an engine part, said method comprising the steps of:

coupling a support shaft to the camshaft of the engine;

coupling a sensor to the engine block;

coupling a ring-like material adapted for being magnetized to the support shaft;

positioning the engine and coupled camshaft and support shaft in a known position;

coupling a magnetic charging tool for magnetizing material to the sensor so that there is a known relation between said charging tool and said ring-like magnetizable material; and magnetizing the ring-like material to form a plurality of magnetic poles.

* * * * *

UNITED STATES PATENT AND TRADEMARK OFFICE

CERTIFICATE OF CORRECTION

PATENT NO. : 4,434,754

DATED : March 6, 1984

INVENTOR(S) : David H. Fox; Charles C. Kostan and Frank B. Casaceli

It is certified that error appears in the above-identified patent and that said Letters Patent are hereby corrected as shown below:

Sheet 1 of drawings, delete patent number "4,444,754" and substitute therefor --4,434,754--.

Sheet 2 of drawings, delete patent number "4,444,754" and substitute therefor --4,434,754--.

Sheet 3 of drawings, delete patent number "4,444,754" and substitute therefor --4,434,754--.

Sheet 4 of drawings, delete patent number "4,444,754" and substitute therefor --4,434,754--.

Signed and Sealed this

*Thirtieth* Day of *April 1985*

[SEAL]

*Attest:*

DONALD J. QUIGG

*Attesting Officer* *Acting Commissioner of Patents and Trademarks*